United States Patent
Roy et al.

(10) Patent No.: US 7,003,646 B2
(45) Date of Patent: Feb. 21, 2006

(54) EFFICIENCY IN A MEMORY MANAGEMENT SYSTEM

(75) Inventors: Sumit Roy, Menlo Park, CA (US); Kenneth Mark Wilson, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 449 days.

(21) Appl. No.: 10/106,025

(22) Filed: Mar. 27, 2002

(65) Prior Publication Data

US 2003/0188121 A1 Oct. 2, 2003

(51) Int. Cl.
*G06F 12/00* (2006.01)
(52) U.S. Cl. .................................. 711/171; 711/170
(58) Field of Classification Search ............... 711/147, 711/170, 171, 165, 202; 345/543, 555
See application file for complete search history.

(56) References Cited

U.S. PATENT DOCUMENTS

| 5,237,460 A | * | 8/1993 | Miller et al. ................. 360/8 |
| 5,544,349 A | * | 8/1996 | Berry et al. ................. 711/165 |
| 5,559,978 A | * | 9/1996 | Spilo ......................... 711/203 |
| 5,627,995 A | * | 5/1997 | Miller et al. ............... 711/171 |
| 5,699,539 A | * | 12/1997 | Garber et al. ................. 711/2 |
| 6,366,289 B1 | * | 4/2002 | Johns ........................ 345/543 |
| 6,681,305 B1 | * | 1/2004 | Franke et al. .............. 711/170 |

* cited by examiner

*Primary Examiner*—Pierre M. Vital
(74) *Attorney, Agent, or Firm*—Richard P. Lange

(57) ABSTRACT

In a method for optimizing performance in a memory system, a data structure configured to provide at least one free block of memory is received in the memory system. At least one bucket of memory is released in a swap device of the memory system corresponding to at least one free block of memory provided by the data structure.

30 Claims, 6 Drawing Sheets

EFFICIENCY IN A MEMORY MANAGEMENT SYSTEM

FIELD OF THE INVENTION

This invention relates generally to memory systems. More particularly, the invention relates to improving efficiency of memory systems.

DESCRIPTION OF THE RELATED ART

A data processing system typically consists of a processor, a volatile memory, e.g., random access memory (RAM) for storing instructions and data, and some form of permanent storage, e.g., a magnetic disk. Due to ever increasing sizes in application programs, operating systems use a technique of virtual memory to extend the visible size of the volatile memory available to the application programs. The technique involves dividing the volatile memory into pages (or blocks) of fixed size with additional pages provided by the permanent storage.

This technique also allows multi-systems to run multiple processes on the data processing system, where each process may be given access to the complete virtual address space of the processor. A translation mechanism is used to convert the virtual address issued by a running process to the physical page that contains the instructions or data required by the running process. When the volatile memory becomes filled with pages of data and/or instructions, the operating system writes the less active pages to the permanent storage. The area of the disk reserved for this purpose is called a swap device or swap file. The newly freed page may then be utilized by the operating system.

Although virtual memory techniques are useful, there are some drawbacks and disadvantages. For instance, if the operating system requests a page that has been previously written to permanent storage, the operating system typically has to fetch the selected page from the swap device and transfer the selected page into the volatile memory. This operation is typically multiple orders of magnitude slower than a direct memory access, i.e., tens of milliseconds for a disk access versus tens of nanosecond for access to memory.

The operating system may attempt to ameliorate the delay (or latency) by switching to another process or by aggressively pre-fetching pages from the permanent storage. However, these techniques may not provide an adequate solution. For example, many computing environments may have a data processing system dedicated to a sole function, e.g., weather modeling, CAD/CAM, etc. Moreover, pre-fetching of pages from permanent storage may not work perfectly if the operating system cannot accurately predict the required pages.

Furthermore, operating systems may contribute to the latency by design. Typically, the kernel of the operating system knows which pages of memory are available in the volatile memory by referencing a free page list. The information contained in the free page list may be beneficial in the management of the virtual memory. For instance, if the swap device could release (or de-reference) the pages on the free page list, the swap device may make more space available for the storage of data and/or instructions. However, the information contained in the free list is not typically disseminated to the swap device in conventional operating systems.

One method that has been suggested to enhance the performance of virtual memory systems utilizes compression techniques to increase the amount of data and/or code that can be kept in the volatile memory. Data tends to have relatively high redundancy once it is moved into the volatile memory. This observation may be due to the occurrence of large runs of similar numbers in case of scientific code, or finite size vocabularies in case of text or databases. The executable code that is normally held in virtual memory also tends to be highly redundant since it consists of sequences of computer instructions. Hence, the space need to store information may be substantially reduced by utilizing compression algorithms.

Unfortunately, conventional data processing systems with compression support typically require that the operating system kernel be modified, which is generally a complex and expensive process. These modifications may also require users to perform significant software upgrades to their existing computers.

SUMMARY OF THE INVENTION

In accordance with an embodiment of the present invention, a method for improving efficiency is utilized in a memory management system. The method includes receiving a data structure configured to provide at least one free page of memory in the memory management system and releasing at least one bucket of memory in a compressed memory swap device of the memory management system corresponding to at least one free page of memory provided by the data structure.

Another embodiment of the present invention relates to a method of operating a memory management system. The method includes receiving a data structure configured to contain at least one free page of memory in the memory management system and receiving a page of memory. The method also includes determining an availability of free space in a swap device and releasing a bucket of memory in the swap device associated with the at least one free page of memory in response to a determination of a lack of free space.

Yet another embodiment of the present invention pertains to a system for managing memory. The system includes a processor, a memory system, an operating system, and a swap device driver. The memory system is configured to have a main memory and a secondary memory. The operating system is configured to be executed by the processor and to manage the memory system as a virtual memory management system. The swap device driver is configured to be executed by the operating system and to provide a compressed memory swap device within the main memory. The swap device driver is also configured to receive a data structure from the operating system where the data structure is configured to provide at least one free page of memory in the memory system. The swap device driver is further configured to release at least one bucket of memory in the compressed memory swap device corresponding to the at least one free page of memory provided by the data structure.

Yet another embodiment of the present invention relates to a system for managing memory. The system includes a processor, a memory system, an operating system, and a swap device driver. The memory system is configured to have a main memory and a secondary memory. The operating system is configured to be executed by the processor and to manage the memory system as a virtual memory management system. The operating system is also configured to provide a data structure configured to contain at least one free page of memory in the virtual memory management system. The swap device driver is configured to be executed by the operating system and to provide a compressed memory swap device within the main memory, where the swap device driver is configured to receive a page of memory. The swap device is also configured to determine an availability of free space in the compressed memory swap device and is further configured to release an associated bucket of memory in the virtual memory management system corresponding to the at least one free page of memory in response to the determination of non-availability of free space.

Yet another embodiment of the present invention pertains to a method for optimizing performance in a memory system. The method includes receiving a data structure configured to provide at least one free block of memory in the memory system and releasing at least one bucket of memory in a swap device of the memory system corresponding to at least one free block of memory provided by the data structure.

Yet another embodiment of the present invention relates to a system for optimizing performance of a memory system. The memory system includes a processor, a buffer, a secondary storage, and a swap device driver. The swap device driver is configured to be executed by the processor. The swap device driver is also configured to receive a data structure from the processor, where the data structure configured to provide at least one block of memory in the buffer. The swap device driver is further configured to release at least one bucket corresponding to the at least one block of memory in one of a reserved area of the buffer and the secondary storage.

BRIEF DESCRIPTION OF THE DRAWINGS

Various features of the present invention can be more fully appreciated as the same become better understood with reference to the following detailed description of the present invention when considered in connection with the accompanying figures, in which.

DETAILED DESCRIPTION OF A PREFERRED EMBODIMENT

Figure 1A:
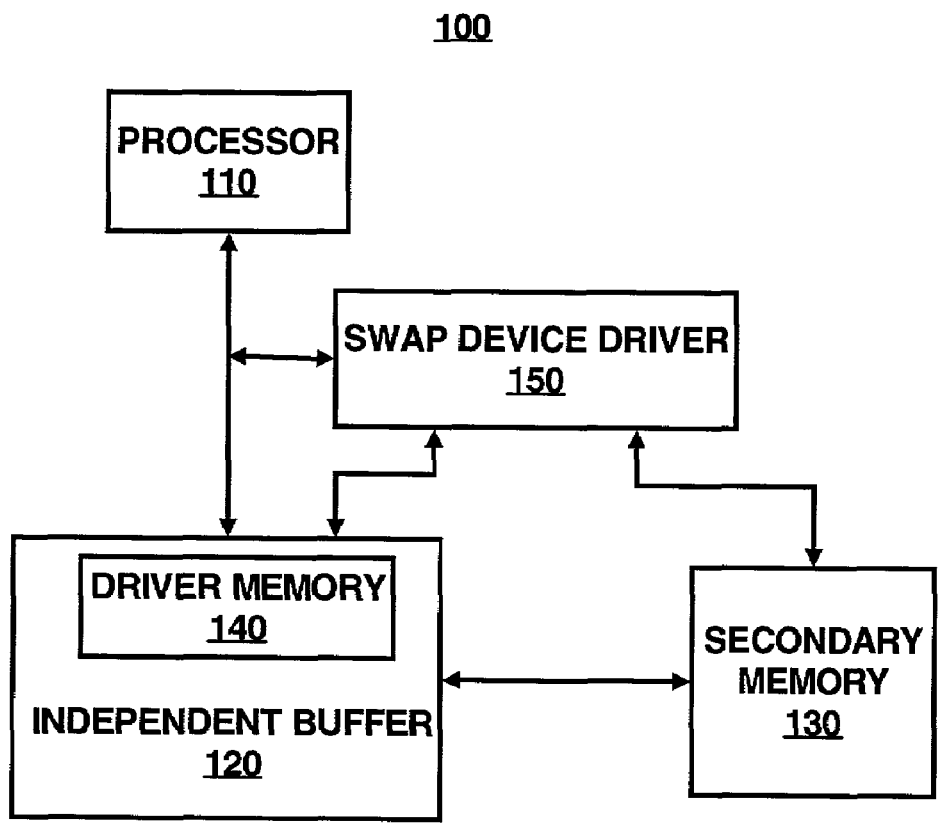
FIG. 1A illustrates an exemplary block diagram of a system utilizing an embodiment of a swap device driver in accordance with an embodiment of the present invention.

For simplicity and illustrative purposes, the principles of the present invention are described by referring mainly to an exemplary embodiment of a swap device driver. However, one of ordinary skill in the art would readily recognize that the same principles are equally applicable to, and can be implemented in, all types of virtual memory systems, and that any such variations do not depart from the true spirit and scope of the present invention. Moreover, in the following detailed description, references are made to the accompanying figures, which illustrate specific embodiments in which the present invention may be practiced. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

In accordance with an embodiment of the present invention, a swap device driver may be utilized to optimize the performance of an independent buffer interfaced with a processing device. The independent buffer may be a data storage device (or construct) that is managed independently of an associated operating system of the processing device. The independent buffer may also be configured to interface with a secondary memory. The secondary memory may provide storage services for blocks that are not able to be stored in the space allocated in the independent buffer.

According to the embodiment, the swap device driver may be configured to optimize the storage space in the independent buffer by presenting a swap device configured with optimized compression services. More specifically, the swap device driver may present a single swap device, however, the swap device may comprise of a reserved area in the independent buffer, e.g., a driver memory, and the secondary memory. The swap device driver may also be configured to provide compression services for blocks (or portions, pages, etc.) between the independent buffer and the swap device. In the event that storage space becomes less available, the independent buffer may be configured to transfer block(s) of memory to the swap device, i.e. the swap device driver may be configured to intercept any requests to the secondary storage. In the event of a write request to the secondary storage, the swap device driver may compress the selected blocks into a bucket(s) and store the bucket(s) in the reserved area of the independent buffer. In the event of a read request from the secondary storage, the swap device driver may be configured to determine if the requested block(s) are stored in reserved area of the independent buffer. If the blocks are stored in the reserved area, the swap device driver may retrieve the associated bucket(s) for the requested block(s), decompress the bucket(s) and provide the requested block(s) to the independent buffer. If the requested block(s) are in the secondary storage, the swap device driver may retrieve the associated bucket(s) from the secondary storage, copy the associated buckets in the reserved area, decompress the bucket(s) and provide the requested block(s) to the independent buffer. Accordingly, the swap device driver may optimize storage of blocks for the independent buffer.

According to another aspect the embodiment of the present invention, the swap device driver may be configured to utilize a kernel data structure of the associated operating system of the processing device to optimize performance of the independent buffer. More specifically, the kernel data structure, e.g., a free list configured to provide a list of free blocks, may be exported from the associated operating system, made available to the swap device driver, retrieved by the swap device driver or some combination thereof. The swap device driver may then use the kernel data structure to de-reference any blocks of memory and associated buckets of memory listed in the kernel data structure. Thus, the swap device driver may create more storage space in the driver memory and secondary memory, and thereby optimizing performance of the independent buffer.

In accordance with another embodiment of the present invention, a swap device driver may be utilized to optimize the performance of a virtual memory management system of a data processing system. More particularly, the swap device driver may be configured to present a single swap device to the virtual memory management system. The swap device may comprise a reserved area of main memory (or driver memory) of the data processing system and the secondary storage of the data processing system. The swap device driver may also be configured to provide compression services for pages of memory of the virtual memory management system between the swap device and the main memory. The swap device driver may be further configured to compress pages of memory intended for secondary storage of the virtual memory management system and store the compressed pages in the reserved area of main memory. Accordingly, the swap device driver may intercept request for page(s) of memory from an operating system of the data processing system. The swap device driver may then determine if the requested page of memory is in the reserved area of main memory or in the secondary storage (e.g., a swap device). If the requested page(s) of memory is stored in the reserved area, the swap device driver may then decompress an associated bucket for the requested page and returns the requested page to the operating system. If the requested page(s) of memory is stored in the secondary storage, the swap device driver may then retrieve an associated bucket(s) for the requested page(s) of memory, store a copy of the associated bucket(s) in the reserved areas, decompress the associated bucket(s) and provide a copy to the operating system.

In accordance with yet another embodiment of the present invention, the swap device driver may be configured to optimize the swap device. In particular, the operating system may be configured to provide the swap device driver with a kernel data structure, e.g., a free list, configured to provide a listing of the available free pages of memory in the virtual memory management system of the data processing system. The swap device driver may be configured to release (or de-reference) any compressed pages of memory that correspond to any of the pages of memory listed on the kernel data structure. The swap device driver may perform this operation of releasing pages of memory in response to a condition of a lack of free space in the swap device, periodically, or by any other triggering condition. Accordingly, the swap device driver may maximize the amount of free space in the swap device for processes to utilize thereby optimizing the performance of the virtual memory space by providing the maximum amount of free space in the swap device.

FIG. 1A illustrates an exemplary block diagram of a system 100 where an embodiment of the present invention may be practiced. As shown in FIG. 1A, the system 100 includes a processor device 110 (labeled as 'processor' in FIG. 1), an independent buffer 120, a driver memory 140, and a secondary memory 130. It should be readily apparent to those of ordinary skill in the art that the system 100 depicted in FIG. 1A represents a generalized schematic illustration and that other components may be added or existing components may be removed or modified without departing from the spirit or scope of the present invention.

Returning to FIG. 1A, the processor 110 may be configured to provide an execution platform for application programs written for the data processing system 100. The processor 110 may be implemented by an INTEL PENTIUM microprocessor, an AMD ATHLON microprocessor, or other similar computing platform.

The processor 110 may be configured to interface with the independent buffer 120. The independent buffer 120 may be configured to provide storage of instructions and/or data. The independent buffer 120 may be utilized by processes executing on the processor 110 or external devices (not shown) interfaced with the system 100. The independent buffer 120 is not under management of an associated operating system (not shown) of the processor 110.

The independent buffer 120 may be further configured to interface with the secondary memory 130. The secondary memory 130 may be configured to provide persistent storage of application programs, data, operating systems or any other types of information for the system 100. The secondary memory 130 is typically substantially slower in terms of access speed than the independent buffer 120 and may be implemented using magnetic disks, optical storage, tapes, or other similar long-term memory devices.

In accordance with an embodiment of the present invention, the independent buffer 120 may include a reserved area of memory, a driver memory 140. The size of the driver memory 140 may be user-defined, predetermined, or a combination thereof set at an initialization of a swap device driver 150. The memory in the driver memory 140 may be configured to store compressed pages of memory from the swap device driver in a data structure consisting of fixed-size chunks called 'buckets'. More specifically, the driver memory 140 may allocate a number of buckets. The size of the buckets may be user-defined. For example, a bucket may be large enough to store one compressed page of memory or several buckets may store one compressed page of memory.

Figure 1B:
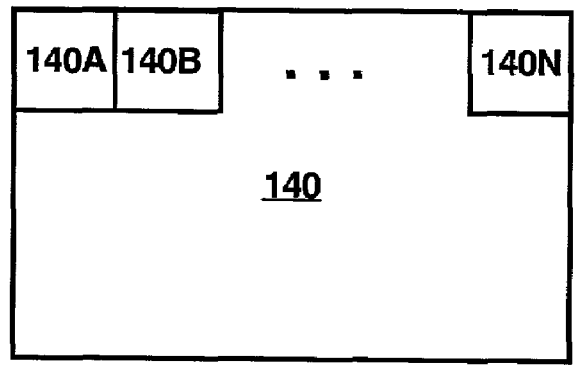
FIG. 1B illustrates an exemplary embodiment of a memory structure for the swap device in accordance with an embodiment of the present invention.

FIG. 1B illustrates an exemplary embodiment of a memory structure for the driver memory 140. As shown, the driver memory 140 may be partitioned into a number of buckets 140A . . . 140N. The number and/or size of the buckets may be user-defined and may depend on the size of the independent buffer 120.

Returning to FIG. 1A, the swap device driver 150 may be configured to compress pages of memory intended for secondary memory 140 and store the compressed pages at least one bucket in the driver memory 140 or in the secondary memory 130 if storage space is unavailable in the driver memory 140.

The swap device driver 150 may be further configured to receive a kernel data structure (shown with respect to FIG. 2), e.g., a free list configured to provide a listing of the available free pages of memory for a process in the system 100. The swap device driver 150 may be configured to release (or de-reference) any buckets that store the compressed pages of memory in the driver memory 140 and/or secondary storage 130 that corresponds to any of the pages of memory listed on the kernel data structure. The swap device driver 150 may perform this operation of releasing pages of memory in response to a condition of a lack of free space in the driver memory 140, periodically, or by any other triggering condition.

Figure 2:
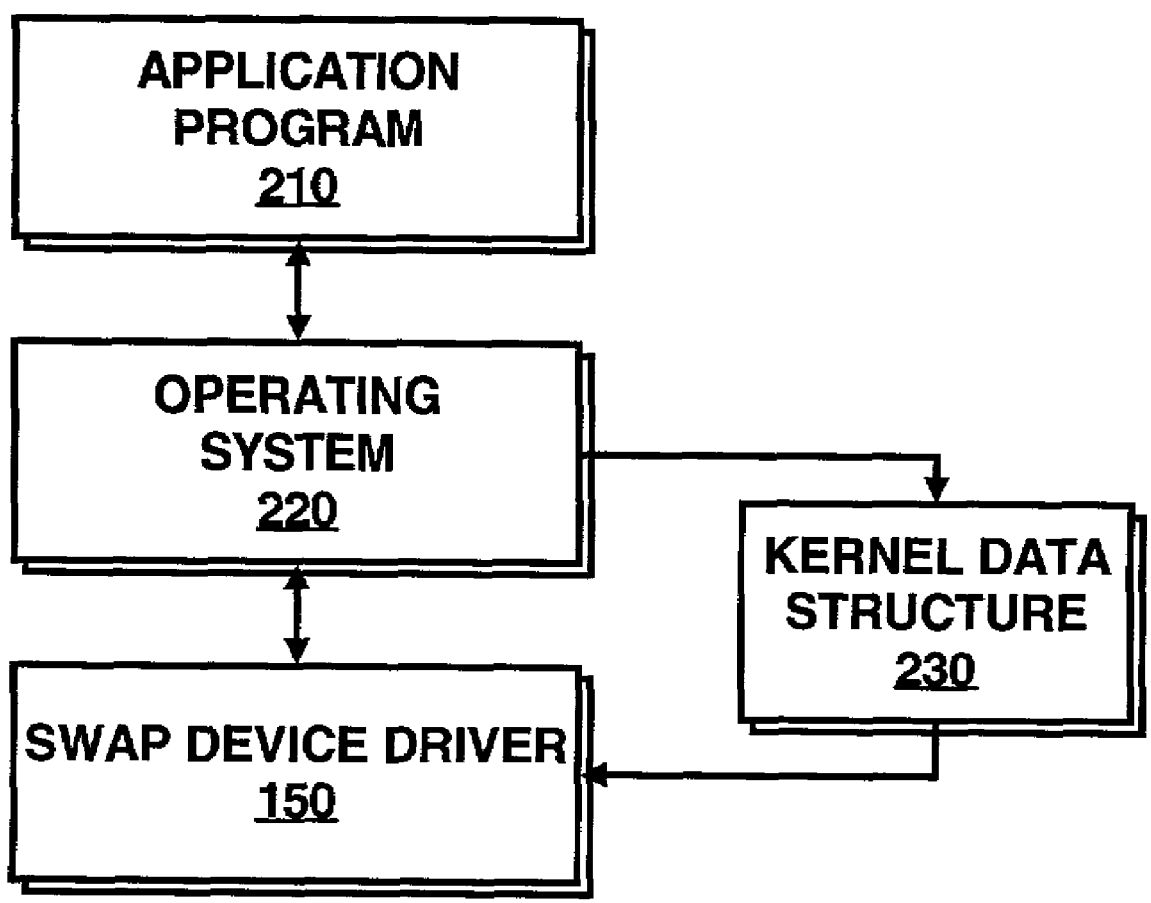
FIG. 2 illustrates an exemplary block diagram of an architecture for the data processing system shown in FIG. 1A in accordance with an embodiment of the present invention.

FIG. 2 illustrates an exemplary block diagram of an architecture 200 for the system 100 shown in FIG. 1A in accordance with an embodiment of the present invention. As shown in FIG. 2, the architecture 200 includes an application program 210, an operating system 220, and a swap device driver 150. It should be readily apparent to those of ordinary skill in the art that the architecture 200 depicted in FIG. 2 represents a generalized schematic illustration and that other components may be added or existing components may be removed or modified without departing from the spirit or scope of the present invention.

The application program 210 may be a software program that is to be stored in the secondary memory 140 and executed by the processor 110. The application program 210 may be a word processing program, a spreadsheet, a simulation, or any type of useful software.

The application program 210 may be configured to interface with the operating system 220. The operating system 220 may be configured to manage the application program 210 in relation with other application programs and to provide an interface to the underlying hardware of the system 100. The operating system 220 may also be configured to interface with the application program 210 through an application program interface (not shown). The operating system 220 may be implemented using LINUX, UNIX, MICROSOFT WINDOWS family, HP-UX, or other types of similar operating systems.

The operating system 220 may be further configured to provide access to devices interfaced with the system 100 through device drivers (not shown). Device drivers are programs that control a particular type of device that is attached to the system 100. A device driver essentially converts the more general input/output instructions of the operating system 220 to messages that the device can understand. As part of the complement of device drivers of the operating system 220, an embodiment of the swap device driver 150 in accordance with the principles of the present invention is included in the architecture 200 of the data processing system 100. Accordingly, the swap device driver 150 may be implemented in conventional operating systems without substantial modifications thereto.

As described above and in further detail below, the swap device driver 150 may be configured to compress pages of memory intended for secondary memory 130 (as shown in FIG. 1A) and store the compressed pages in the driver memory 140 and/or secondary memory 130. The swap device driver 150 may be further configured to receive a kernel data structure 230, e.g., a free list, configured to provide a listing of the available free pages of memory for a process in the system 100. Alternatively, the kernel data structure 230 may be exported from the operating system 230, retrieved by the swap device driver 150 or some combination thereof. The swap device driver 150 may be further configured to release (or de-reference) any compressed pages of memory in the driver memory 140 and/or secondary memory 130 that corresponds to any of the pages of memory listed on the kernel data structure. The swap device driver 150 may perform this operation of releasing buckets of memory in response to a condition of a lack of free space in the swap device, periodically, or by any other triggering condition.

Figure 3:
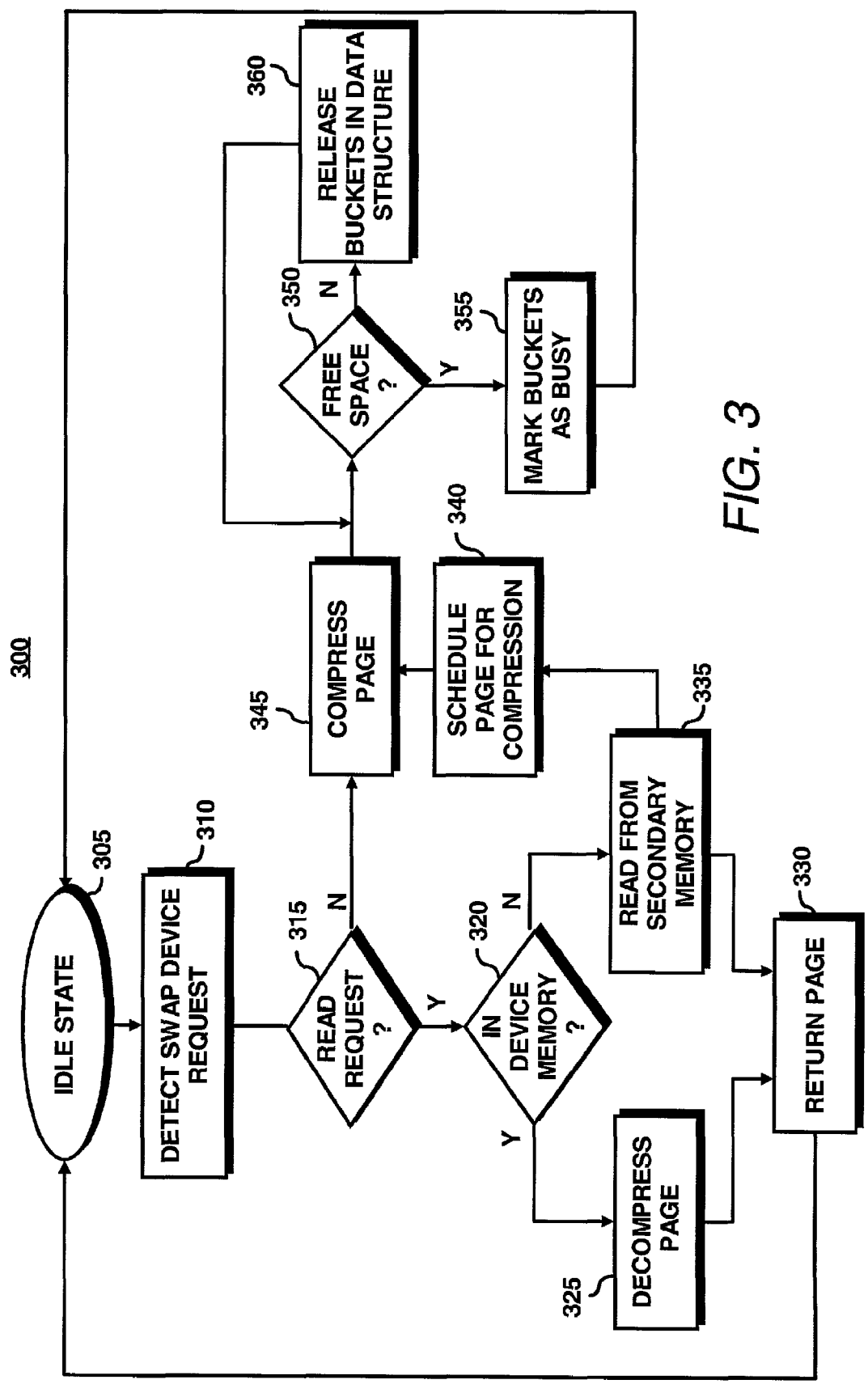
FIG. 3 illustrates an exemplary flow diagram of an operational mode of the swap device driver shown in FIG. 1.

FIG. 3 illustrates an exemplary flow diagram 300 of an operational mode of the swap device driver 150 shown in FIG. 1. It should be readily apparent to those of ordinary skill in the art that the operational mode of the swap device driver 150 depicted in FIG. 3 represents a generalized schematic illustration and that other steps may be added or existing steps may be removed or modified without departing from the spirit or scope of the present invention.

As shown in FIG. 3, the swap device driver 150 may be in an idle state in step 305. The swap device driver 150 may detect a swap device request for blocks of memory by the independent buffer, in step 310.

In step 315, the swap device driver 150 may be configured to determine if the swap device request is a read request. If the page fault is a read request, the swap device driver 150 may also be configured to determine if the requested (or selected) page is in the driver memory 140 or swap device 130), in step 320.

If the selected page is located in the driver memory 140, the swap device driver 150 may be configured to retrieve the compressed selected page from the bucket(s) that contain the selected page and decompress the selected page, in step 325. The swap device driver 150 may be configured, in step 330, to return the decompressed selected page to the independent buffer 120 and subsequently return to the idle state of step 305. Otherwise, if the selected page is not stored in the driver memory 140, in step 335, the swap device driver 150 may be further configured to retrieve the selected page from the secondary memory 130, e.g., a disk, and forward the selected page for compression in at least one bucket in the driver memory 140, in step 340. Subsequently, the swap device driver 150 may be configured to proceed to the processing of step 330.

Returning to step 315, if the page fault is not a read request, which indicates a write request, the swap device driver 150 may be configured to compress the received page, in step 345. Incidentally, any pages that have been scheduled for compression from previous read page faults may also be compressed at this time.

In step 350, the swap device driver 150 may be configured to determine if there is any available space in the driver memory 140. If there is available free space in the driver memory 140, the swap device driver 150 may also be configured to store the compressed page(s) of memory in a free location and subsequently mark the buckets, i.e., location, as busy or occupied.

Otherwise, if there is lack of free space in the driver memory 140, the swap device driver 150 may be configured to utilize the exported data structure, e.g., a free list of pages from an associated operating system of the processor 110 to release buckets (or locations) in the driver memory 140, in step 360. In particular, the swap device driver 150 may search the data structure for pages that have been previously compressed. If there are matching compressed pages in the driver memory 140, the swap device driver 150 may de-allocate or release the buckets of the matching compressed pages for storage of the new compressed pages. Alternatively, the swap device driver 150 may be configured to perform this de-allocation procedure periodically or by any other triggering condition.

Figure 4A:
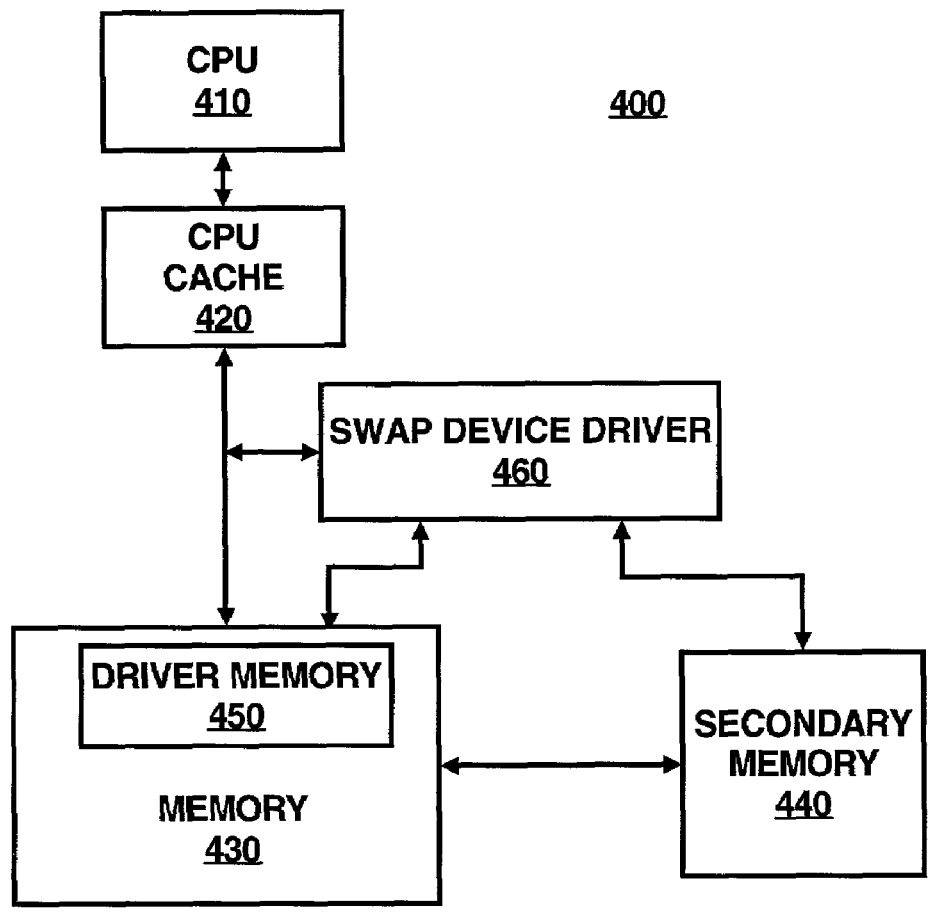
FIG. 4A illustrates an exemplary block diagram of a system utilizing another embodiment of the present invention.

FIG. 4A illustrates an exemplary block diagram of a data processing system 400 where an embodiment of the present invention may be practiced. As shown in FIG. 4A, the data processing system 400 includes a central processing unit (CPU) 410, a CPU cache 420, a memory 430, and a secondary memory 440. It should be readily apparent to those of ordinary skill in the art that the data processing system 400 depicted in FIG. 4A represents a generalized schematic illustration and that other components may be added or existing components may be removed or modified without departing from the spirit or scope of the present invention.

Returning to FIG. 4A, the CPU 410 may be configured to provide an execution platform for application programs written for the data processing system 400. The CPU 410 may be implemented by an INTEL PENTIUM microprocessor, an AMD ATHLON microprocessor, or other similar computing platform.

The CPU 410 may also be configured to interface with a CPU cache 420. The CPU cache 420 may be configured to provide a fast temporary storage of instructions and/or data between the CPU 410 and the memory 430. The CPU cache 420 may be implemented as part of the CPU 410, a separate static RAM, or a combination thereof.

The memory 430 may be configured to provide storage of instructions and/or data for the processes being executed by the CPU 410. The memory 430 may also be configured to provide storage for an operating system (not shown) and some or all application programs and related data.

The memory 430 may be further configured to interface with the secondary memory 440. The secondary memory 440 may be configured to provide permanent storage of application programs, data, operating systems or any other types of information for the data processing system 400. The secondary memory 440 is typically substantially slower in terms of access speed than the memory 430 and may be implemented using magnetic disks, optical storage, tapes, or other similar long-term memory devices.

The operating system of the data processing system 400 may also be configured to implement a virtual memory system (not shown) with the memory 430 and secondary memory 440. The virtual memory system implemented by the operating system may be configured to provide processes with a larger logical memory space than the physical size of the memory 430. Typically, the memory 430 is divided into fixed-size contiguous areas called page frames and to divide application programs into pieces of the same size, called pages. A page swap occurs when a page containing a word required by the CPU 410 is not currently stored in memory 430. When this condition, called a page fault, occurs, the execution of the program or process is suspended until the required page is retrieved from secondary memory 140, where the secondary memory 440 is functioning as a swap device.

A portion of the memory 430 may be allocated (or reserved) as a driver memory 450. The size of the driver memory 450 may be user-defined, predetermined, or a combination thereof set at an initialization of a swap device driver (not shown). The memory in the driver memory 450 may be configured to store compressed pages of memory from the swap device driver in a data structure consisting of fixed-size chunks called 'buckets'. More specifically, the driver memory 450 may allocate a number of buckets. The size of the buckets may be user-defined. For example, a bucket may be large enough to store one compressed page of memory or several buckets may store one compressed page of memory.

Figure 4B:
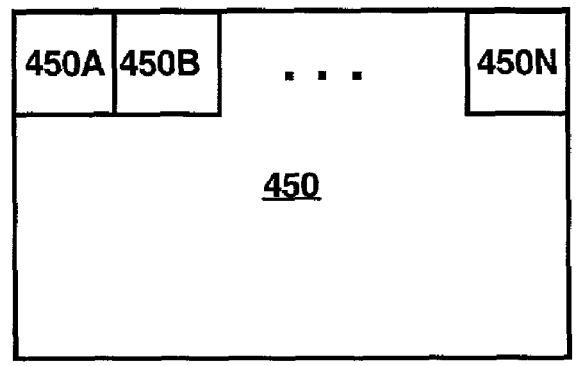
FIG. 4B illustrates an exemplary embodiment of a memory structure for the swap device in accordance with an embodiment of the present invention.

FIG. 4B illustrates an exemplary embodiment of a memory structure for the driver memory 450. As shown, the driver memory 450 may be partitioned into a number of buckets 450A . . . 450N. The number and/or size of the buckets may be user-defined and may depend on the size of the swap device.

Returning to FIG. 4A, the swap device driver 460 may be configured to a view to an operating system of an conventional swap device. However, the swap device driver 460 provides for a swap device that comprises of the driver memory 450 and the second memory 440. The swap device drive 460 may intercept page faults from the virtual memory system and compress pages of memory intended for secondary memory 440 and store the compressed pages at least one bucket in the driver memory 450. For a further detailed explanation of this aspect of the swap device driver may be found in the U.S. patent application Ser. No. 09/829,496, entitled "VIRTUAL MEMORY SYSTEM UTILIZING DATA COMPRESSION IMPLEMENTED THROUGH A DEVICE DRIVER", filed 9 Apr. 2001, which is hereby incorporated by reference in its entirety.

The swap device driver 460 may be further configured to receive a kernel data structure, e.g., a free list, configured to provide a listing of the available free pages of memory for a process in the data processing system. The swap device driver 460 may be configured to release (or de-reference) any buckets that store the compressed pages of memory in the driver memory 450 that corresponds to any of the pages of memory listed on the kernel data structure. The swap device driver may perform this operation of releasing pages of memory in response to a condition of a lack of free space in the driver memory 450, periodically, or by any other triggering condition.

Figure 5:
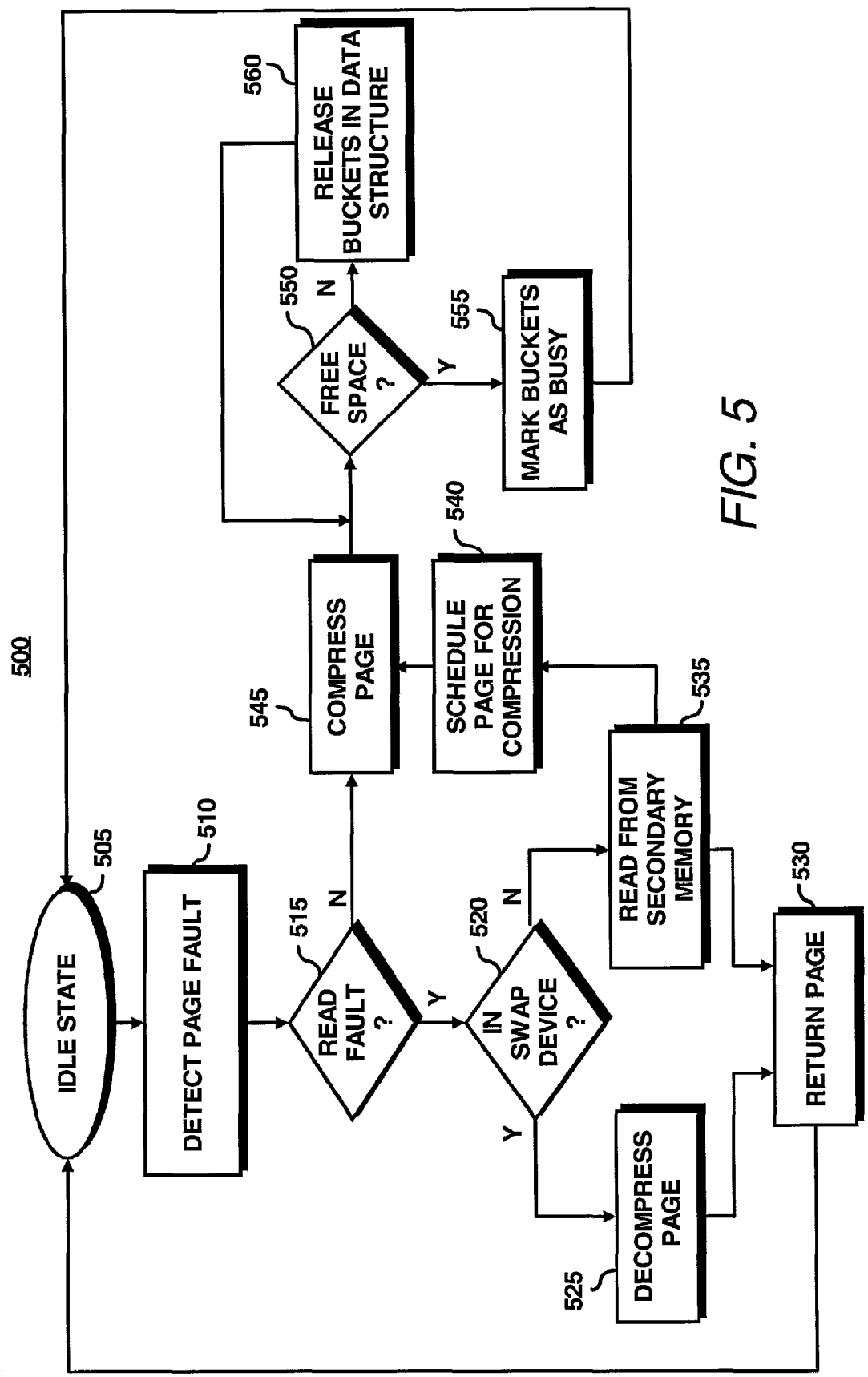
FIG. 5 illustrates an exemplary flow diagram of another operational mode of the swap device driver shown in FIG. 1.

FIG. 5 illustrates an exemplary flow diagram 500 of an operational mode of the swap device driver 460 shown in FIG. 4A. It should be readily apparent to those of ordinary skill in the art that the operational mode of the swap device driver 460 depicted in FIG. 5 represents a generalized schematic illustration and that other steps may be added or existing steps may be removed or modified without departing from the spirit or scope of the present invention.

As shown in FIG. 5, the swap device driver 460 may be in an idle state in step 505. The swap device driver 460 may detect a page fault for the received page requested by the CPU 110, in step 510.

In step 515, the swap device driver 460 may be configured to determine if the page fault is a read fault. If the page fault is a read fault, the swap device driver 460 may also be configured to determine if the requested (or selected) page is in the driver memory 450 (or secondary memory 440, in step 520.

If the selected page is located in the driver memory 450 the swap device driver 460 may be configured to retrieve the compressed selected page from the bucket(s) that contain the selected page and decompress the selected page, in step 525. The swap device driver 460 may be configured, in step 530, to return the decompressed selected page to the operating system (not shown) and subsequently return to the idle state of step 505. Otherwise, if the selected page is not stored in the driver memory 450, in step 535, the swap device driver 460 may be further configured to retrieve the selected page from the secondary memory 440, e.g., a disk, and forward the selected page for compression in at least one bucket in the driver memory 450, in step 540. Subsequently, the swap device driver 460 may be configured to proceed to the processing of step 530.

Returning to step 515, if the page fault is not a read fault, which indicates a write fault, the swap device driver 460 may be configured to compress the received page, in step 545. Incidentally, any pages that have been scheduled for compression from previous read page faults may also be compressed at this time.

In step 550, the swap device driver 460 may be configured to determine if there is any available space in the driver memory 450. If there is available free space in the driver memory 450, the swap device driver 460 may also be configured to store the compressed page(s) of memory in a free location and subsequently mark the buckets, i.e., location, as busy or occupied.

Otherwise, if there is lack of free space in the driver memory 450, the swap device driver 460 may be configured to utilize the exported data structure, e.g., a free list of pages from the virtual memory system, from an operating system such as operating system 220 to release buckets (or locations) in the driver memory 450, in step 560. In particular, the swap device driver 460 may search the data structure for pages that have been previously compressed. If there are matching compressed pages in the driver memory 450, the swap device driver 460 may deallocate or release the buckets of the matching compressed pages for storage of the new compressed pages. Alternatively, the swap device driver 460 may be configured to perform this de-allocation procedure periodically or by any other triggering condition.

Figure 6:
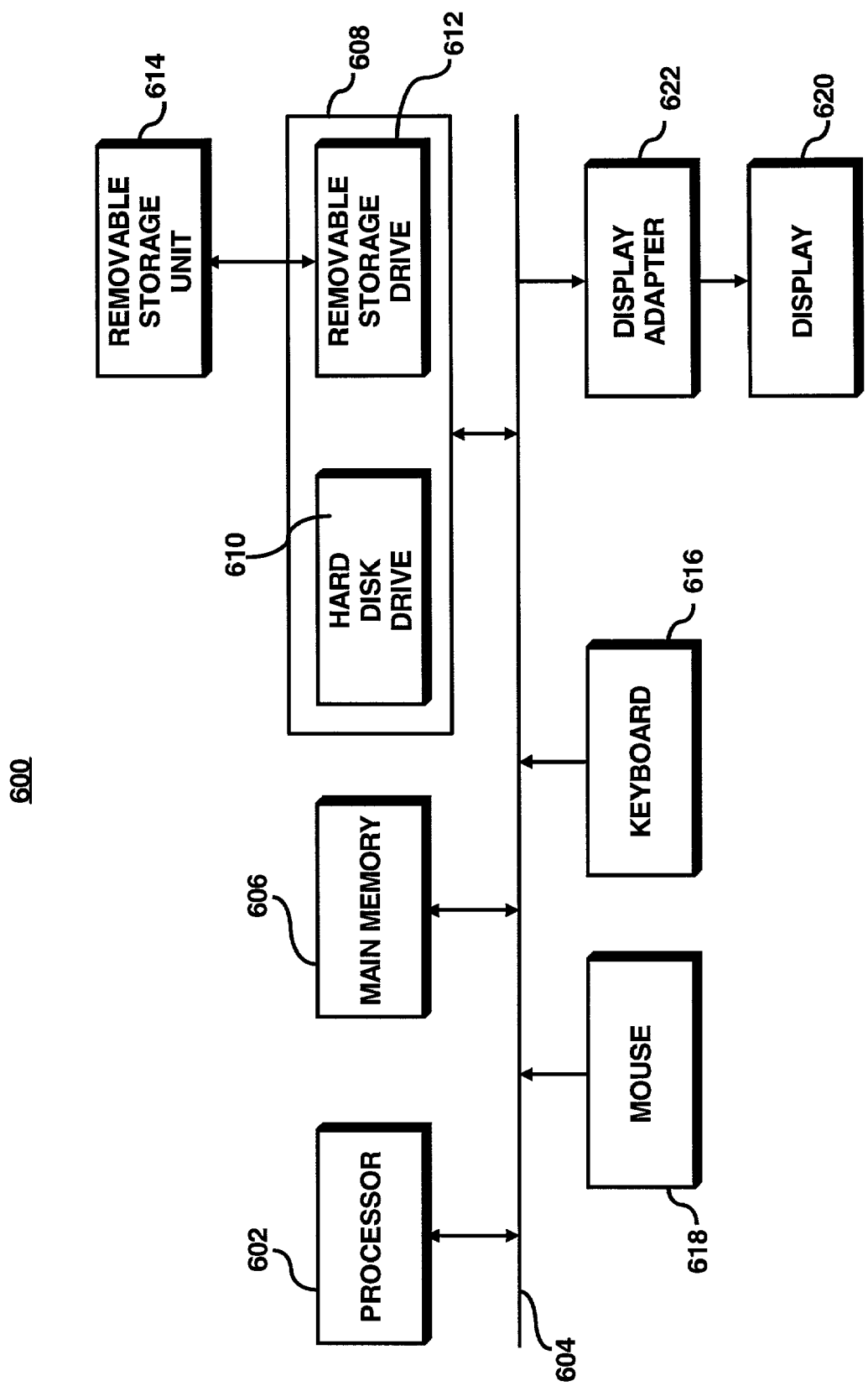
FIG. 6 illustrates an exemplary block diagram of a computer system where an embodiment of the present invention may be practiced.

FIG. 6 illustrates an exemplary block diagram of a computer system 600 where an embodiment of the present invention may be practiced. The functions of the swap device driver may be implemented in program code and executed by the computer system 600. The peer privacy module may be implemented in computer languages such as PASCAL, C, C++, JAVA, etc.

As shown in FIG. 6, the computer system 600 includes one or more processors, such as processor 602, that provide an execution platform for embodiments of the swap device driver. Commands and data from the processor 602 are communicated over a communication bus 604. The computer system 600 also includes a main memory 606, preferably Random Access Memory (RAM), where the software for the swap device driver may be executed during runtime, and a secondary memory 608. The secondary memory 608 includes, for example, a hard disk drive 610 and/or a removable storage drive 612, representing a floppy diskette drive, a magnetic tape drive, a compact disk drive, etc., where a copy of a computer program embodiment for the swap device driver may be stored. The removable storage drive 612 reads from and/or writes to a removable storage unit 614 in a well-known manner. A user interfaces with the swap device driver with a keyboard 616, a mouse 618, and a display 620. The display adaptor 622 interfaces with the communication bus 604 and the display 620 and receives display data from the processor 602 and converts the display data into display commands for the display 620.

According to an embodiment of the present invention, a swap device driver may be configured to compress pages of memory intended for secondary memory and store the compressed pages in buckets in a reserved area of a memory (swap device) in a data processing system. The swap device driver may be further configured to receive a kernel data structure, e.g., a free list, configured to provide a listing of the available free pages of memory for a process in the virtual memory system. The swap device driver may be configured to release (or de-reference) any buckets containing the compressed pages of memory in the swap device that corresponds to any of the pages of memory listed on the kernel data structure. The swap device driver may perform this operation of releasing pages of memory in response to a condition of a lack of free space in the swap device, periodically, or by any other triggering condition. Accordingly, the swap device driver may maximize the amount of free space in the swap device for processes to utilize thereby optimizing the performance of the virtual memory space by providing the maximum amount of free space in the swap device.

Certain embodiments of the present invention may be performed as a computer program. The computer program may exist in a variety of forms both active and inactive. For example, the computer program can exist as software program(s) comprised of program instructions in source code, object code, executable code or other formats; firmware program(s); or hardware description language (HDL) files.

Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. In particular, although the method of the present invention has been described by examples, the steps of the method may be performed in a different order than illustrated or simultaneously. Those skilled in the art will recognize that these and other variations are possible within the spirit and scope of the invention as defined in the following claims and their equivalents.

What is claimed is:

1. A method for improving efficiency in a memory management system, comprising:

receiving a data structure configured to provide at least one free page of memory in said memory management system; and releasing at least one bucket of memory in a compressed memory swap device of said memory management system corresponding to said at least one free page of memory provided by said data structure;

initiating a request for a selected page of memory in response to a read page fault;

retrieving said selected page of memory in response to a determination of said selected page of memory being located in a secondary storage of said memory management system;

returning said selected page of memory;

scheduling said selected page of memory for compression in said compressed memory swap device;

compressing said selected page of memory in response to said scheduling of said selected page of memory;

determining an availability of free space in said compressed memory swap device;

storing said requested page of memory in a selected bucket in said compressed memory swap device in response to said released page of memory in said compressed memory swap device; and marking said selected bucket as busy in response to said storage of said requested page of memory.

2. The method according to claim 1, wherein:

said compressed memory swap device is included in a main memory of a computer system, said computer system being configured to implement said memory management system.

3. The method according to claim 1, further comprising:
decompressing said selected page of memory in response to a determination of said selected page of memory being located in said compressed memory swap device; and
returning said selected page of memory.

4. The method according to claim 1, further comprising:
freeing at least one bucket in said compressed memory swap device corresponding to said at least one free page of memory in said memory management system provided by said data structure in response to a lack of free space in said compressed memory swap device.

5. A method of operating a memory management system, comprising:
receiving a data structure configured to contain at least one free page of memory in said memory management system;
receiving a page of memory;
determining an availability of free space in a swap device;
releasing a bucket of memory in said swap device associated with said at least one free page of memory in response to a determination of a lack of free space;
storing said page of memory in a selected bucket in said swap device; and
marking said selected bucket of memory in said swap device as busy.

6. The method according to claim 5, further comprising:
receiving said data structure on a periodic basis.

7. The method according to claim 5, further comprising:
receiving said data structure along with said page of memory.

8. The method according to claim 5, wherein said data structure is a free list data structure.

9. The method according to claim 5, wherein said data structure is exported from a kernel of said memory management system.

10. A system for managing memory, comprising:
a processor;
a memory system comprising a main memory and a secondary memory;
an operating system configured to be executed by said processor and to manage said memory system as a virtual memory management system; and
a swap device driver configured to be executed by said operating system and to provide a compressed memory swap device within said main memory, wherein said swap device driver is configured to receive a data structure from said operating system, said data structure being configured to provide at least one free page of memory in said memory system and said swap device driver also being configured to release at least one bucket of memory in said compressed memory swap device corresponding to said at least one free page of memory provided by said data structure;
wherein said swap device driver is further configured to determine an availability of free space in said compressed memory swap device and is yet further configured to release said at least one bucket of memory in response to a determination of a non-available free space in said compressed memory swap device.

11. The system according to claim 10, wherein said swap device driver is configured to initiate a request for a selected page of memory in response to a read page fault, is further configured to decompress said selected page of memory in response to a determination of said selected page of memory being located in said compressed memory swap device, and is yet further configured to return said selected page of memory.

12. The system according to claim 10, wherein said swap device driver is configured to initiate a request for a selected page of memory in response to a read page fault, is further configured to retrieve said selected page of memory from said secondary memory in response to a determination of said selected page of memory being located in said secondary memory, and is yet further configured to return said selected page of memory to said operating system.

13. The system according to claim 12, wherein said swap device driver is further configured to schedule said selected page of memory for compression in said compressed memory swap device and is yet further configured to compress said selected page of memory according to said scheduling of said selected page of memory.

14. A system for managing memory, comprising:
a processor;
a memory system comprising a main memory and a secondary memory;
an operating system configured to be executed by said processor and to manage said memory system as a virtual memory management system;
a swap device driver configured to be executed by said operating system and to provide a compressed memory swap device within said main memory, wherein said swap device driver is configured to receive a data structure from said operating system, said data structure being configured to provide at least one free page of memory in said memory system and said swap device driver also being configured to release at least one bucket of memory in said compressed memory swap device corresponding to said at least one free page of memory provided by said data structure;
wherein said swap device driver is configured to initiate a request for a selected page of memory in response to a read page fault, is further configured to retrieve said selected page of memory from said secondary memory in response to a determination of said selected page of memory being located in said secondary memory, and is yet further configured to return said selected page of memory to said operating system;
wherein said swap device driver is further configured to schedule said selected page of memory for compression in said compressed memory swap device and is yet further configured to compress said selected page of memory according to said scheduling of said selected page of memory; and
wherein said swap device driver is configured to determine an availability of free space in said compressed memory swap device, is further configured to store said selected page of memory in at least one bucket of memory in said compressed memory swap device in response to said determination of available free space, and is yet further configured to mark a location of said selected page of memory in said compressed memory swap device as busy.

15. The system according to claim 14, wherein said swap device driver is configured to determine an availability of free space in said compressed memory swap device and is further configured to free at least one bucket of memory in said compressed memory swap device corresponding to said at least one free page of memory in said memory system provided by said data structure.

16. The system according to claim 14, wherein said data structure comprises a free list configured to provide a listing of free pages of memory in said virtual memory management system.

17. The system according to claim 14, wherein said data structure is exported from said operating system.

18. A system for managing memory; comprising:
a processor;
a memory system comprising a main memory and a secondary memory;
an operating system being configured to be executed by said processor, also being configured to manage said memory system as a virtual memory management system, and further being configured to provide a data structure configured to contain at least one free page of memory in said virtual memory management system; and
a swap device driver configured to be executed by said operating system and to provide a compressed memory swap device within said main memory, wherein said swap device driver is configured to receive a page of memory, to determine an availability of free space in said compressed memory swap device, and to release an associated bucket of memory in said virtual memory management system corresponding to said at least one free page of memory in response to said determination of non-availability of free space; and
wherein said swap device driver is further configured to store said page of memory in a bucket in said compressed memory swap device and is further configured to mark said bucket of memory in said compressed memory swap device as busy.

19. The system according to claim 18, wherein said operating system is configured to provide said data structure on a periodic basis.

20. The system according to claim 18, wherein said operating system is configured to provide said data structure along with said page of memory.

21. The system according to claim 18, wherein said data structure comprises a free list configured to provide a listing of available pages of memory in said virtual memory management system.

22. A method for optimizing performance in a memory system, comprising:
receiving a data structure configured to provide at least one free block of memory in said memory system; and
releasing at least one bucket of memory in a swap device of said memory system corresponding to said at least one free block of memory provided by said data structure;
writing a selected block of memory in response to a write request;
scheduling said selected block of memory for said write request for compression; and
compressing said selected block of memory for said write request in response to said scheduling of said selected page of memory;
determining an availability of free space in a reserved area of said memory system;
storing said selected block of memory for said write request in a selected bucket in said reserved area in response to a released page of memory in said reserved area of said memory system; and
marking said selected bucket as busy in response to said storage of said selected block of memory for said write request.

23. The method according to claim 22, further comprising:
initiating a request for a selected block of memory in response to a read request;
decompressing a selected bucket of memory corresponding to said selected block of memory in response to said selected bucket of memory being located in a reserved area of said memory system; and
returning said block of memory.

24. The method according to claim 22, further comprising:
initiating a request for a selected block of memory in response to a read request;
retrieving a bucket of memory corresponding to said selected block of memory in response to a determination of said selected block of memory for said read request being located in a secondary storage of said memory system; and
returning said selected block of memory after decompressing said bucket of memory.

25. A system for optimizing performance of a memory system, comprising:
a processor;
a buffer;
a secondary storage;
a swap device driver configured to be executed by said processor, wherein said swap device driver is configured to receive a data structure from said processor, said data structure configured to provide at least one block of memory in said buffer, and said swap device driver also being configured to release at least one bucket corresponding to said at least one block of memory in one of a reserved area of said buffer and said secondary storage;
said swap device driver is further configured:
to schedule said selected block of memory for compression in said compressed memory swap device and is yet further configured to compress said selected block of memory according to said scheduling of said selected block of memory;
to compress said selected block of memory according to said scheduling of said selected block of memory;
to determine an availability of free space in said reserved area of said buffer;
to store said selected block of memory in at least one bucket of memory in said reserved area of said buffer in response to said determination of available free space; and
to mark a location of said selected block of memory in said reserved area of said buffer as busy.

26. The system according to claim 25, wherein said swap device driver is further configured to release said at least one bucket of memory in response to a determination of a non-available free space in said reserved area of said buffer.

27. The system according to claim 25, wherein said swap device driver is further configured to decompress said selected block of memory in response to a determination of said selected block of memory being located in said reserved area of said buffer, and is yet further configured to return said selected block of memory.

28. The system according to claim 25, wherein said swap device driver is further configured to free at least one bucket of memory in said reserved area of said buffer corresponding to said at least one free block of memory in said memory system provided by said data structure.

29. The system according to claim 25, wherein said data structure comprises a free list configured to provide a listing of free blocks of memory in said buffer.

30. The system according to claim 25, wherein said data structure is exported from said operating system.

* * * * *

UNITED STATES PATENT AND TRADEMARK OFFICE
CERTIFICATE OF CORRECTION

PATENT NO. : 7,003,646 B2
APPLICATION NO. : 10/106025
DATED : February 21, 2006
INVENTOR(S) : Sumit Roy et al.

It is certified that error appears in the above-identified patent and that said Letters Patent is hereby corrected as shown below:

In column 1, line 22, delete "multi-systems" and insert -- multi-tasking systems --, therefor.

In column 12, line 38, in Claim 1, after "system;" delete "and".

In column 15, line 17, in Claim 18, after "system;" delete "and".

In column 16, lines 17-18, in Claim 24, after "memory" delete "for said read request".

Signed and Sealed this

Fourteenth Day of April, 2009

JOHN DOLL
*Acting Director of the United States Patent and Trademark Office*